(12) United States Patent  
Chen

(10) Patent No.: US 6,338,575 B1
(45) Date of Patent: Jan. 15, 2002

(54) SELF-LUBRICATING BEARINGS AND ASSEMBLIES THEREOF

(75) Inventor: Chien-Jung Chen, Kaohsiung Hsien (TW)

(73) Assignee: Yen Sun Technic Industrial Corporation (TW)

( * ) Notice: Subject to any disclaimer, the term of this patent is extended or adjusted under 35 U.S.C. 154(b) by 0 days.

(21) Appl. No.: 09/562,456

(22) Filed: May 2, 2000

(51) Int. Cl.[7] ............................................... F16C 33/10
(52) U.S. Cl. ........................................ 384/279; 384/902
(58) Field of Search ................................ 384/279, 902, 384/100, 107–113

(56) References Cited

U.S. PATENT DOCUMENTS

| | | | | |
|---|---|---|---|---|
| 2,227,307 A | * | 12/1940 | Hildabolt | 384/279 |
| 5,145,266 A | * | 9/1992 | Saneshige et al. | 384/279 X |
| 5,746,516 A | * | 5/1998 | Miyasaka et al. | 384/279 X |
| 5,762,423 A | * | 6/1998 | Mori et al. | 384/279 |
| 5,810,479 A | * | 9/1998 | Miyasaka et al. | 384/902 X |
| 5,810,481 A | * | 9/1998 | Nii et al. | 384/279 |
| 5,899,572 A | * | 5/1999 | Strobl | 384/279 |
| 6,119,346 A | * | 9/2000 | Miyasaka et al. | 384/279 X |

FOREIGN PATENT DOCUMENTS

| | | | | |
|---|---|---|---|---|
| JP | 64-30923 A | * | 2/1989 | 384/279 |
| JP | 55-11922 A | * | 9/1989 | 384/279 |

* cited by examiner

Primary Examiner—Thomas R. Hannon
(74) Attorney, Agent, or Firm—Larson & Taylor, PLC

(57) ABSTRACT

A self-lubricating bearing includes an axle hole having a first section and a second section. The first section includes a first inner transverse length and the second section includes a second inner transverse length that is greater than the first inner transverse length. The second section is contiguous to at least one of two end faces of the self-lubricating bearing. A self-lubricating bearing assembly is constructed by a plurality of self-lubricating bearings that are stacked one another. The difference between the first inner transverse length and the second inner transverse length provides an oil-storing compartment for the lubricating oil.

8 Claims, 3 Drawing Sheets

SELF-LUBRICATING BEARINGS AND ASSEMBLIES THEREOF

BACKGROUND OF THE INVENTION

1. Field of the Invention

The present invention relates to self-lubricating bearings and self-lubricating bearing assemblies, wherein the self-lubricating bearings can be manufactured easily with improved lubricating effect.

2. Description of the Related Art

FIG. 1 of the drawings illustrates a conventional self-lubricating bearing assembly including an axle tube 90 mounted in a casing and a self-lubricating bearing 91 mounted in the axle tube 90 in a tight fitting manner. The self-lubricating bearing 91 includes an axial hole with an inner diameter R1 that is the same as an outer diameter of a shaft 92 of a rotor (not shown), thereby rotatably holding the shaft 92. The self-lubricating bearing includes relatively small pores to release lubricating oil for smoothing rotation of the shaft 92. In order to provide longer longevity for the self-lubricating bearing, in addition to an oil reservoir 93 provided in a bottom of the axle tube 90, an inner periphery defining the axial hole of the self-lubricating bearing 91 includes a groove 94 having an inner diameter R2 greater than R1 to provide an additional place for storage of lubricating oil.

FIG. 2 illustrates another conventional self-lubricating bearing assembly including a self-lubricating bearing 91' that is mounted in an axle tube 90'. The self-lubricating bearing 91' includes an axial hole for rotatably receiving a shaft 92' of a rotor (not shown). An inner periphery defining the axial hole of the self-lubricating bearing 91' includes a continuous groove 95' for circulating the lubricating oil.

In the above-mentioned self-lubricating bearing assemblies, the self-lubricating bearings are formed by die casting, in which the groove is closed at two ends thereof, rather than in contact with end faces of the self-lubricating bearings. As a result, the grooves cannot be formed integrally with the self-lubricating bearings such that the grooves need to be machined after formation of the self-lubricating bearings. Thus, processing of the grooves is troublesome and difficult, as the self-lubricating bearing is rigid.

SUMMARY OF THE INVENTION

It is an object of the present invention to provide a self-lubricating bearing that can be manufactured easily.

It is a secondary object of the present invention to provide a self-lubricating bearing assembly that can be manufactured easily and that may receive lubricating oil for smoothing rotation of the shaft and lengthening longevity of the self-lubricating bearing.

A self-lubricating bearing includes an axle hole having a first section and a second section. The first section includes a first inner transverse length and the second section includes a second inner transverse length that is greater than the first inner transverse length. The second section is contiguous to at least one of two end faces of the self-lubricating bearing. A self-lubricating bearing assembly is constructed by a plurality of self-lubricating bearings that are stacked one another. The difference between the first inner transverse length and the second inner transverse length provides an oil-storing compartment for the lubricating oil.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

The term "axial hole" referred to herein means a longitudinal hole defined in a self-lubricating bearing for rotatably supporting a shaft about a fixed central axis. The term "first inner transverse length" referred to herein means the most frequently measured transverse length in a first section of the axial hole, the transverse length passing through the central axis of the shaft and being a minimal length of the axial hole. The first inner transverse length is equal to an inner diameter of the axial hole. The term "second inner transverse length" referred to herein means a transverse length measured in a second section of the axial hole, the transverse length passing through the central axis of the shaft. The second inner transverse length is greater than the first inner transverse length and may have more than two dimensions.

Figure 1:
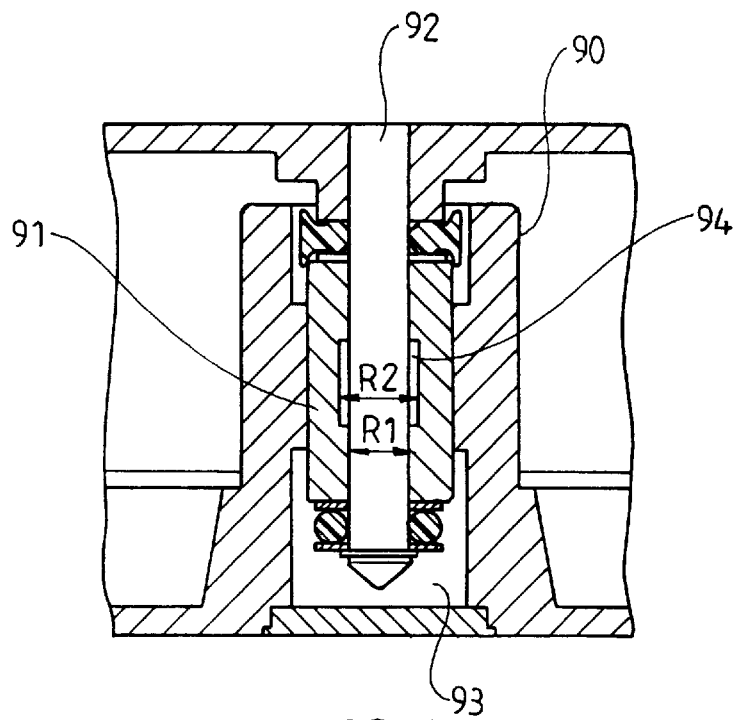
FIG. 1 is a sectional view illustrating a conventional self-lubricating bearing assembly.
Figure 2:
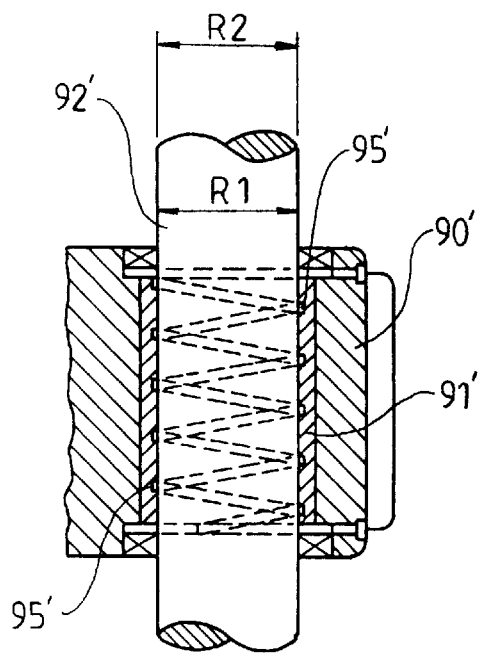
FIG. 2 is a sectional view illustrating another conventional self-lubricating bearing assembly.
Figure 3:
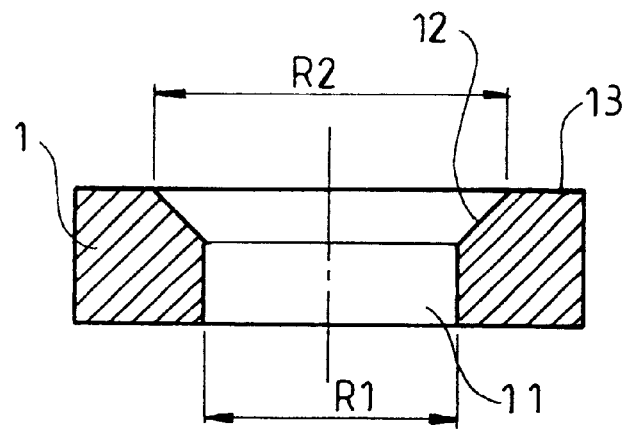
FIG. 3 is a sectional view of a first embodiment of a self-lubricating bearing in accordance with the present invention.

Referring to FIG. 3, a first embodiment of a self-lubricating bearing in accordance with the present invention can be made of various materials by various methods to form a circular ring 1 having an outer periphery with a fixed outer diameter. The circular ring 1 includes an axial hole 11 that is preferably located in a center of the circular ring. The axial hole 11 includes a first section with a first inner transverse length R1. The axial hole 11 further includes a second section in the form of a conic section 12 that tapers inward from an end face 13 of the circular ring 1 (the self-lubricating bearing). The conic section 12 has a second inner transverse length R2 that is progressively decreased inwardly. Nevertheless, the second inner transverse length R2 of the conic section 12 is greater than the first inner transverse length R1 of the first section of the axial hole 11.

Figure 4:
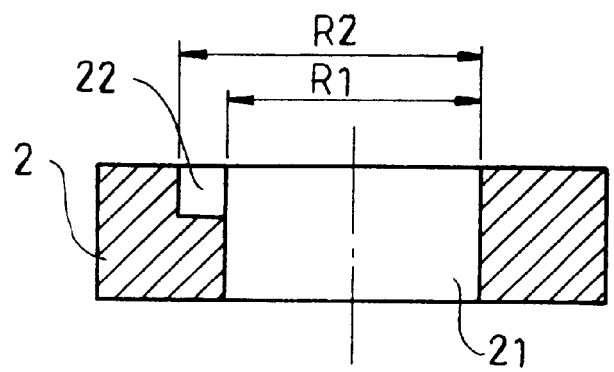
FIG. 4 is a sectional view of a second embodiment of the self-lubricating bearing in accordance with the present invention.

FIG. 4 shows a second embodiment of the self-lubricating bearing in accordance with the present invention, wherein the self-lubricating bearing (now designated by 2) includes an outer periphery with a fixed outer diameter. The self-lubricating bearing 2 includes an axial hole 21 that is preferably located in a center of the circular ring. The axial hole 21 includes a first section with a first inner transverse length R1. An end face of the axial hole 21 is provided with a recessed section or groove 22, thereby forming a second section having a second inner transverse length R2 greater than the first inner transverse length R1 of the first section.

Figure 5:
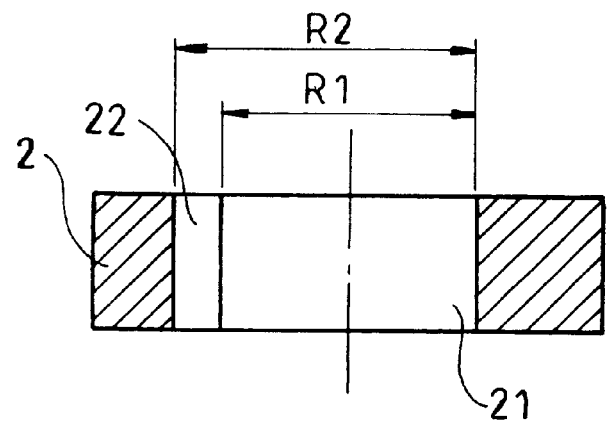
FIG. 5 is a sectional view of a third embodiment of the self-lubricating bearing in accordance with the present invention.

FIG. 5 shows a third embodiment of the self-lubricating bearing that is modified from the second embodiment, wherein the groove 22 extends along an overall longitudinal length of the inner periphery of the axial hole 21 (namely, the groove 22 extends between two end faces of the self-lubricating bearing), thereby defining an axial hole having a first inner transverse length R1 and a second inner transverse length R2.

Figure 6:
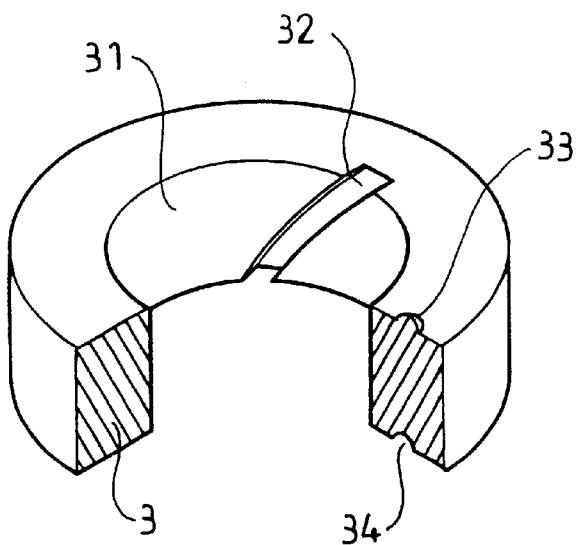
FIG. 6 is a perspective view, partly cutaway, of a fourth embodiment of the self-lubricating bearing in accordance with the present invention.

FIG. 6 illustrates a fourth embodiment of the self-lubricating bearing in accordance with the present invention. In this embodiment, the self-lubricating bearing 3 includes an inclined groove 32 defined in an inner periphery of the axial hole 31 thereof. Thus, the self-lubricating bearing 3 includes a first inner transverse length R1 and a second inner transverse length R2 that is greater than R1. When a plurality of self-lubricating bearings 3 are stacked one another, a lower end of the inclined groove 32 of an upper self-lubricating bearing 3 is communicated with an upper end of the inclined groove 32 of a lower self-lubricating bearing 3, thereby providing a continuous helical oil groove for guiding the lubricating oil. In order to position the stacked self-lubricating bearings 3, each self-lubricating bearing 3 includes a protrusion 33 on a first end face thereof and a depression 34 in a second end face thereof such that the protrusion 33 on the first end face of a lower self-lubricating bearing 3 is positioned in the depression 34 in the second end face of an upper self-lubricating bearing 3. Provision of the protrusion 33 and depression 34 may assist in communication of the inclined grooves 32 of the stacked self-lubricating bearings 3.

Figure 7:
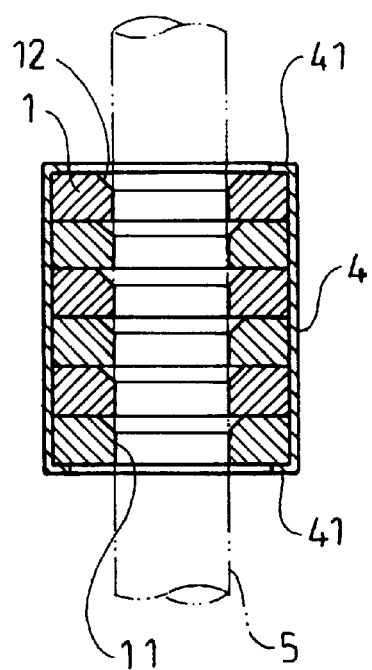
FIG. 7 is a sectional view of a first embodiment of a self-lubricating bearing assembly constructed by a plurality of the self-lubricating bearings in accordance with the present invention.

FIG. 7 is a sectional view of a first embodiment of a self-lubricating bearing assembly constructed by a plurality of the self-lubricating bearings 1 of the first embodiment in accordance with the present invention. The self-lubricating bearings 1 are stacked and enclosed by a housing 4 made of metal or plastics. The housing 4 includes a stop 41 on each end thereof for restraining the self-lubricating bearings 1. It is known to have a stop 41 formed on an end of the housing 4 and form the other stop 41 on the other end of the housing 4 by means of bending to prevent disengagement of the self-lubricating bearings 1. Thus, the axial holes 11 of the self-lubricating bearings 1 are aligned with one another for rotatably supporting a shaft 5. A plurality of oil-storing compartments are provided between the self-lubricating bearings 1 and the shaft 4, as each self-lubricating bearing 1 includes a first inner section having a first inner transverse length R1 and a second section having a second inner transverse length R2 that is greater than R1. As a result, oil-storing compartments are formed, and the lubricating oil stored in the oil-storing compartments is released to smooth rotation of the shaft 5 and to lengthen longevity of the self-lubricating bearings 1.

As can be known from the above embodiments, different self-lubricating bearings in accordance with the present invention can be put into a housing 4 for smoothing rotation of the shaft 5 and lengthening longevity of the self-lubricating bearings regardless of alignment of the grooves 22 or inclined grooves 32.

Figure 8:
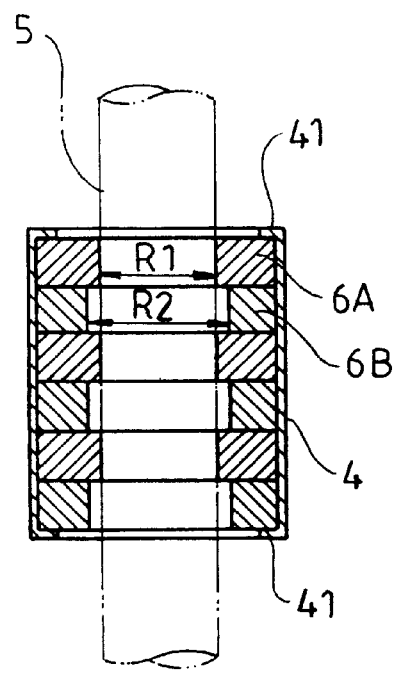
FIG. 8 is a sectional view of a second embodiment of the self-lubricating bearing assembly in accordance with the present invention.

FIG. 8 is a sectional view of a second embodiment of the self-lubricating bearing assembly constructed by a plurality of the self-lubricating bearings in accordance with the present invention. In this embodiment, a plurality of alternately disposed self-lubricating bearings 6A and 6B are stacked and enclosed in a housing 4 and retained in place by two stops 41. Each self-lubricating bearing 6A has an inner diameter R1 for rotatably holding a shaft 5. Each self-lubricating bearing 6B has an inner diameter R2 that is greater than R1 so as to define an oil-storing compartment between each self-lubricating bearing 6B and its adjacent self-lubricating bearing 6A. Rotation of the shaft 5 is smoothened and longevity of the self-lubricating is lengthened.

The self-lubricating bearings in accordance with the present invention can be manufactured easily although each of them has a first section with a first inner transverse length R1 and a second section with a second inner transverse length R2 that is greater than R1. This is because the second section is contiguous to the first section such that the former can be integrally formed during formation of the self-lubricating bearing without further processing. In addition, the difference between the first inner transverse length R1 and the second inner transverse length R2 provides an oil-storing compartment for receiving lubricating oil that is used to smoothen rotation of the shaft and lengthening longevity of the self-lubricating bearing.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A self-lubricating bearing comprising an axial hole for rotatably supporting a shaft about a fixed central axis, the axial hole including a first section having a first inner transverse length that passes through the fixed central axis and a second section having a second inner transverse length that passes through the fixed central axis and that is greater than the first inner transverse length, the second section being contiguous to at least one of two end faces of the self-lubricating bearing, the second section being formed by means of providing a groove in at least one of the two end faces of the self-lubricating bearing, which groove extends between the two end faces of the axial hole and is inclined between the two end faces of the self-lubricating bearing, and wherein one of the end faces of the self-lubricating bearing includes a protrusion and other end face of the self-lubricating bearing includes a depression for receiving said protrusion of another said self-lubricating bearing, thereby positioning the self-lubricating bearings that are stacked on each other.

2. The self-lubricating bearing as claimed in claim 1, wherein the first inner transverse length of the first section is an inner diameter of the axial hole.

3. The self-lubricating bearing as claimed in claim 1, wherein the groove is a continuous helical groove.

4. A self-lubricating bearing assembly comprising:

a plurality of self-lubricating bearings each comprising an axial hole for rotatably supporting a shaft about a fixed central axis, the axial hole including a first section having first inner transverse length that passes through the fixed central axis and a second section having a second inner transverse length that passes through the fixed central axis and that is greater than the first inner transverse length, the second section being contiguous to at least one of two end faces of the self-lubricating bearing; and a housing for enclosing the self-lubricating bearings and including at least one stop for preventing disengagement of the self-lubricating bearings.

5. The self-lubricating bearing assembly as claimed in claim 4, wherein each said self-lubricating bearing includes an inclined groove that extends between two end faces of the self-lubricating bearing, wherein one of the end faces of each said self-lubricating bearing includes a protrusion and the other end face of each said self-lubricating bearing includes a depression for receiving said protrusion of another said self-lubricating bearing, thereby positioning the stacked self-lubricating bearings.

6. The self-lubricating bearing assembly as claimed in claim 5, wherein each said inclined groove includes a first end and a second end, and wherein the first end of said inclined groove of one of the self-lubricating bearings is aligned with the second end of the inclined groove of an adjacent said self-lubricating bearing.

7. The self-lubricating bearing assembly as claimed in claim 4, wherein the housing includes a first end and a second end, a first stop being integrally formed on the first end of the housing, and the second end of the housing is deformed inward to form a second stop, thereby preventing disengagement of the self-lubricating bearings.

8. A self-lubricating bearing assembly comprising:

a plurality of self-lubricating bearings each including an axial hole for rotatably supporting a shaft about a fixed central axis and having a first inner transverse length that passes through the central axis, at least one said self-lubricating bearing including a second inner transverse length that passes through the central axis and that is greater than the first inner transverse length, wherein said at least one self-lubricating bearing having the second inner diameter is sandwiched between two said self-lubricating bearings having the first inner diameter; and a housing for enclosing all of the self-lubricating bearings and including at least one stop for preventing disengagement of all of the self-lubricating bearings.

* * * * *